(12) United States Patent
Sanderson

(10) Patent No.: US 8,899,529 B2
(45) Date of Patent: Dec. 2, 2014

(54) ELECTRICAL POWER TRANSMITTING TELESCOPIC STRUT

(75) Inventor: Timothy Sanderson, Bristol (GB)

(73) Assignee: Airbus Operations Limited, Bristol (GB)

(*) Notice: Subject to any disclaimer, the term of this patent is extended or adjusted under 35 U.S.C. 154(b) by 1043 days.

(21) Appl. No.: 12/801,597

(22) Filed: Jun. 16, 2010

(65) Prior Publication Data

US 2010/0327111 A1 Dec. 30, 2010

(30) Foreign Application Priority Data

Jun. 25, 2009 (GB) .................. 0911016.4

(51) Int. Cl.
*B64C 3/50* (2006.01)
*H01R 41/00* (2006.01)
*B64C 9/22* (2006.01)
*B64D 15/12* (2006.01)

(52) U.S. Cl.
CPC .......... *H01R 41/00* (2013.01); *Y02T 50/44* (2013.01); *B64C 9/22* (2013.01); *B64D 15/12* (2013.01)
USPC .......................................... 244/215

(58) Field of Classification Search
USPC ........ 244/214, 215, 37, 100 R, 134 D, 135 R, 244/228; 92/5 R, 263
See application file for complete search history.

(56) References Cited

U.S. PATENT DOCUMENTS

| | | | | |
|---|---|---|---|---|
| 2,769,554 A | * | 11/1956 | Bodine | 211/119.15 |
| 3,324,254 A | * | 6/1967 | Shaw et al. | 381/363 |
| 3,534,317 A | * | 10/1970 | Ohlson et al. | 439/10 |
| 4,188,081 A | * | 2/1980 | Holden et al. | 439/192 |
| 4,553,798 A | | 11/1985 | Murphy | |
| 4,615,499 A | * | 10/1986 | Knowler | 244/134 B |
| 4,940,415 A | * | 7/1990 | Westergren | 439/192 |
| 4,969,837 A | * | 11/1990 | Genoa et al. | 439/191 |
| 6,458,125 B1 | * | 10/2002 | Cosmescu | 606/42 |
| 7,226,302 B2 | * | 6/2007 | Walter et al. | 439/191 |
| 7,517,221 B2 | * | 4/2009 | Chidakel et al. | 439/32 |
| 7,883,116 B2 | * | 2/2011 | Canale | 285/7 |
| 8,371,536 B2 | * | 2/2013 | Soenarjo | 244/213 |
| 2005/0022338 A1 | * | 2/2005 | Muhlenkamp | 15/414 |
| 2006/0038088 A1 | * | 2/2006 | Dodson | 244/214 |
| 2008/0078879 A1 | * | 4/2008 | Weaver | 244/131 |
| 2008/0314697 A1 | * | 12/2008 | Kloos | 188/73.1 |
| 2010/0050864 A1 | * | 3/2010 | Morath | 92/5 R |
| 2012/0174771 A1 | * | 7/2012 | De Maglie et al. | 92/5 R |

FOREIGN PATENT DOCUMENTS

DE 196 32 624 2/1998
DE 100 07 400 8/2001

(Continued)

OTHER PUBLICATIONS

UK Search Report dated Nov. 20, 2009 for GB 0911016.4.

*Primary Examiner* — Valentina Xavier
(74) *Attorney, Agent, or Firm* — Nixon & Vanderhye P.C.

(57) ABSTRACT

A telescopic strut comprises a plurality of hollow members arranged to slide one within another between a retracted and an extended position. Adjacent hollow members are arranged to be electrically connected by one or more electrical connector assemblies as the hollow members move between the retracted and extended positions. Each electrical connector assembly includes an electrically conductive pad on one of the hollow members which is in sliding contact with an electrically conductive strip on the other of the hollow members. The telescopic strut may be used to electrically connect a moveable control surface to a fixed aerofoil structure in an aircraft.

15 Claims, 5 Drawing Sheets

(56) References Cited

FOREIGN PATENT DOCUMENTS

| | | |
|---|---|---|
| DE | 20 2004 000 425 U1 | 5/2004 |
| JP | 7-322462 | 12/1995 |
| WO | WO 2006/007939 | 1/2006 |
| WO | WO 2006/027624 | 3/2006 |
| WO | WO 2008/139213 | 11/2008 |

\* cited by examiner

ELECTRICAL POWER TRANSMITTING TELESCOPIC STRUT

This application claims priority to GB Application No. 0911016.4 filed 25 Jun. 2009, the entire contents of which is hereby incorporated by reference.

FIELD OF THE INVENTION

The present invention relates to a telescopic strut for transmitting electrical power. In particular, this invention relates to a telescopic strut for transmitting electrical power between a fixed aerofoil structure and a movable control surface in an aircraft, although the telescopic strut is not limited to this application.

BACKGROUND OF THE INVENTION

Ice protection of aircraft leading edge structures has traditionally been provided on large commercial aircraft through the use of bleed air. Smaller aircraft have used combinations of inflatable rubber de-icing boots, and de-icing fluid. Helicopters have had significant experience of electrical ice protection solutions. Most previous applications of helicopter electrical ice protection have been on fixed structures, which by definition do not move. The only exception to this being electrical ice protection on helicopter rotor blades where the power is transmitted through a slip ring system of joints, the technology of which is used over much of the engineering industry.

There is now a move to incorporate electrical de-icing systems into commercial fixed wing aircraft. The areas of commercial fixed wing aircraft that have particular need for ice protection are the movable leading edge slat structures.

Electrical power is transmitted for other reasons across mechanically actuated joints. This is traditionally achieved in a variety of ways. For example, a folding arm type joint may have an electrical cable within each arm connected by a slip ring type rotary joint between the arms, which rotates as the arms are extended. A telescopic tube may have a helically wound electrical cable therein, similar to a telephone cable, the effective length of which changes with telescoping of the tube. An electrical cable may alternatively be encased by chain links, which limit the bend radius of the cable as the ends of the chain links are moved towards and away from one another.

All the current technological options require that the electrical cable is manipulated. This manipulation can cause the electrical wires of the cable to break, which poses reliability issues. All of these prior art cabling solutions have further disadvantages of being either heavy, or having a high space requirement.

WO2006/027624A describes a coupling arrangement for coupling services between an aircraft wing fixed aerofoil component and a extendable leading edge slat mounted thereto. The coupling arrangement includes a housing for connection to the fixed aerofoil structure, and a hollow telescopic assembly extendable between a retracted and an extended position. A service carrying conduit arrangement carries the services, such as electrical power cables, between the fixed aerofoil component and the leading edge slat, and extends through the hollow telescopic assembly. The service carrying conduit arrangement is flexible and excess thereof is located within the housing when the telescopic assembly is in the retracted position. The excess weight and space requirements of the housing for storing the excess of the flexible conduit, together with the manipulation of the electrical cables within the conduit when stored in the housing, exemplifies some of the problems with prior art solutions.

There is therefore a need in the art for an improved system for electrically connecting structures translationally movable relative to one another.

SUMMARY OF THE INVENTION

A first aspect of the invention provides a telescopic strut comprising a plurality of hollow members arranged to slide one within another between a retracted and an extended position, wherein adjacent hollow members are arranged to be electrically connected by one or more electrical connector assemblies as the hollow members move between the retracted and extended positions, wherein each electrical connector assembly includes an electrically conductive pad on one of the hollow members which is in sliding contact with an electrically conductive strip on the other of the hollow members.

A second aspect of the invention provides an aircraft comprising a fixed aerofoil structure and a control surface moveable between a retracted and an extended position with respect to the fixed aerofoil structure, and a telescopic strut physically and electrically connected between the fixed aerofoil structure and the control surface and which telescopes with the movement of the control surface, wherein the telescopic strut includes one or more electrical connector assemblies, each having an electrically conductive pad in sliding contact with an electrically conductive strip for maintaining the electrical connection during telescoping of the strut.

A third aspect of the invention provides a method of electrically connecting a fixed aerofoil structure to a control surface moveable between a retracted and an extended position with respect to the fixed aerofoil structure in an aircraft, the method comprising physically and electrically connecting a telescopic strut between the fixed aerofoil structure and the control surface; and moving the control surface between its retracted and extended positions accompanied by corresponding telescoping of the telescopic strut, wherein the telescopic strut includes one or more electrical connector assemblies, each having an electrically conductive pad in sliding contact with an electrically conductive strip for maintaining the electrical connection during telescoping of the strut.

The present invention is advantageous in that the telescopic strut is more lightweight, more compact and more reliable. The use of a telescopic strut leads to significant space savings when compared with folding arm connections, or extending/retracting chain links. Significant reliability improvement is provided by the elimination of cable manipulation within the telescopic strut. Since no excess cabling exists when the telescopic strut is retracted, there is no need for a separate housing (unlike the arrangement described in WO2006/027624A1) and so significant weight savings can also be achieved.

Each electrical connector assembly is arranged between adjacent hollow members. The electrically conductive pad of each connector assembly may either be provided external to an inner one of the adjacent hollow members, or internal to an outer one of the adjacent hollow members. The respective electrically conductive strip is provided on the other of the adjacent hollow members. Preferably, each electrically conductive strip is set in a groove. The groove may be formed either into a wall of the relevant hollow member, or the groove may be formed on the wall of the relevant hollow member. Each electrically conductive pad may be arranged to run within the groove of its respective electrically conductive strip.

Where more than one electrical path is desired to run the length of the telescopic strut, a plurality of electrical connector assemblies may be arranged between adjacent hollow members. Where the hollow members are tubular, the plurality of electrical connector assemblies may be arranged circumferentially in the annular space between adjacent hollow tubular members. The plurality of electrical connector assemblies may be regularly arranged in this annular space.

Where the telescopic strut has a plurality of closely spaced electrical connector assemblies at high voltage, these may need to be separated to prevent arcing. Where adjacent electrically conductive assemblies are adapted to carry electrical signals which may interfere with one another (e.g. a power cable signal and an adjacent sensor cable signal), the adjacent electrical connector assemblies may need to be electrically shielded.

To prevent arcing between the electrically conductive pad and its respective electrically conductive strip, the electrically conductive pad may be biased against the strip. The bias means may be a leaf type spring, for example. The bias means may be provided between the electrically conductive pad and the hollow member on which the pad is mounted.

To ensure smooth sliding of the hollow members one within the other, one or more sliding spigots may be provided on one of the hollow members which cooperate with a respective recess on the other of the hollow members to maintain the alignment of adjacent hollow members. The spigots may be formed of dielectric material and may be disposed between adjacent electrically conductive strips so as to prevent arcing. Alternatively, the spigots may be made of conductive material and used in combination with conductive hollow members so as to form an electrical shield, where desired.

To prevent ingress of water and/or grease, the telescopic struts may further comprise one or more covers for sealing ends of the hollow members. The hollow members may need to be hermetically sealed. It is important to prevent water ingress where the operational environment of the telescopic strut requires this so as to prevent shorting problems. It is important to prevent ingress of grease and dust or particulate material where the operational environment of the telescopic strut requires this as ingress of these materials may damage the electrically conductive pads. Preferably, one end of each cover is attached to an outer surface of one of the hollow members, and the other end of each cover has a sealing element for sealing the cover against either another cover or another one of the hollow members. The sealing element may be an O-ring, a blade seal, or the like.

To ensure a reliable electrical connection at each end of the strut, an electrical connection terminal may be provided at one or both ends of the strut. Alternatively, one or more wires or cables electrically connected to each electrical connector assembly at each end of the telescopic strut may be provided, these wires or cables extending from the telescopic strut through an appropriate aperture for connection to external electrical components.

Where the telescopic strut is used to electrically connect a fixed aerofoil structure to a control surface in an aircraft, the control surface may be driven between its retracted and extended positions by an actuator. Preferably, telescoping of the strut is driven passively by movement of the control surface between the retracted and extended positions. However, in some applications it may be beneficial to actively drive the strut to telescope between its retracted and extended positions.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
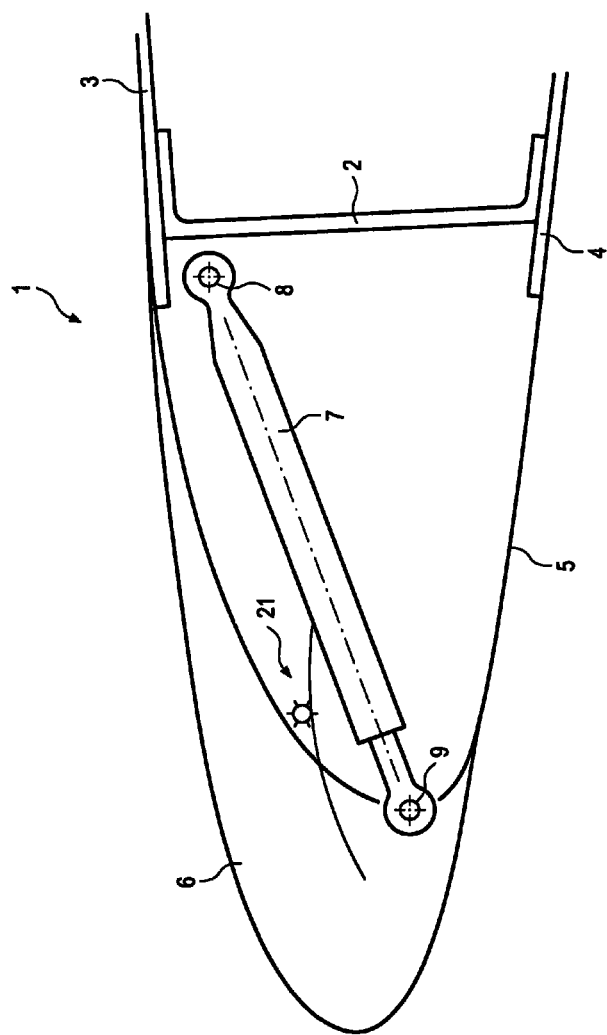
FIG. 1 shows a partial section view of an aircraft wing leading edge having a extendable slat and a telescopic strut electrically connecting the fixed aerofoil structure to the slat, and the slat and telescopic strut are shown in their retracted positions.

FIG. 1 shows an aircraft wing leading edge. The aircraft wing includes a fixed aerofoil structure 1 comprising a front spar 2, an upper wing cover 3, a lower wing cover 4, and a leading edge panel 5. The aircraft wing further includes a leading edge slat 6 mounted to the fixed aerofoil structure 1. The leading edge slat 6 is shown in a retracted position in FIG. 1.

An electrical power transmitting telescopic strut 7 is pivotally connected at one end 8 to the fixed aerofoil structure 1, and is pivotally connected at its other end 9 to the slat 6. The telescopic strut 7 is shown in a retracted position in FIG. 1. The telescopic strut is electrically connected to electrical systems (not shown) within the fixed aerofoil structure 1 at its end 8. The telescopic strut 7 is electrically connected to services (not shown) such as electrical heating de-icing equipment within the slat 6 at its end 9.

Figure 2:
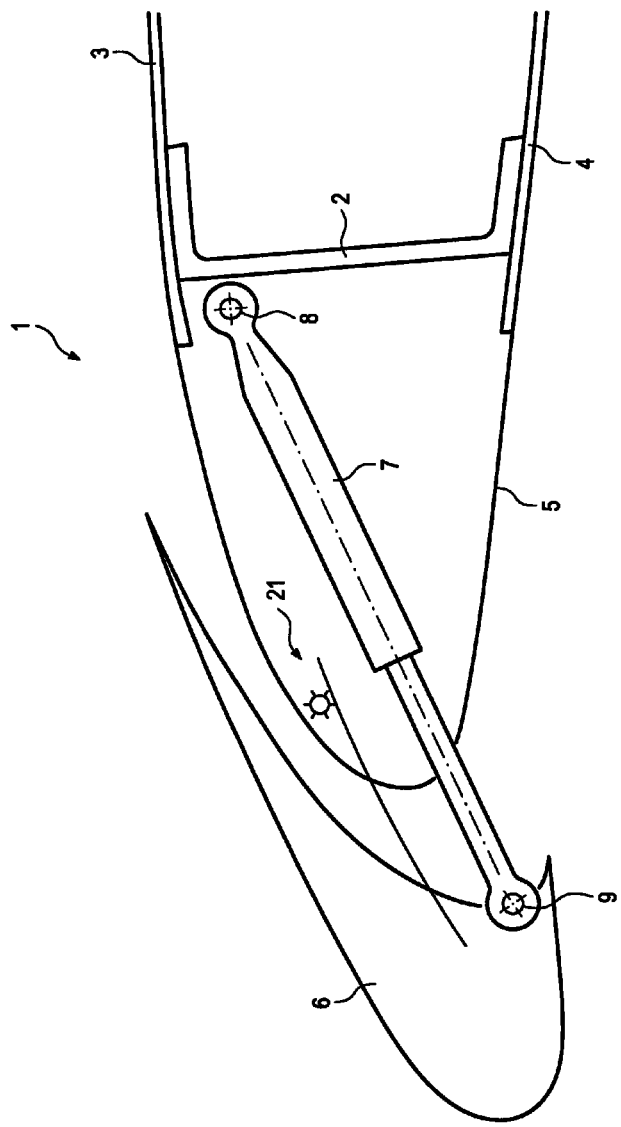
FIG. 2 shows the wing structure of FIG. 1 with the slat and telescopic strut shown in the extended position.

FIG. 2 shows the aircraft wing leading edge with the slat 6 in a extended position. A conventional rack and pinion type slat actuator 21 is used to move the slat 6 between its extended and retracted positions. When the slat 6 is in its extended position as shown in FIG. 2, the telescopic strut 7 is in an extended configuration. Electrical connection between the slat 6 and the fixed aerofoil structure 1 is maintained by the electrical power transmitting telescopic strut 7 as the slat 6 moves between its retracted and extended positions.

Figure 3:
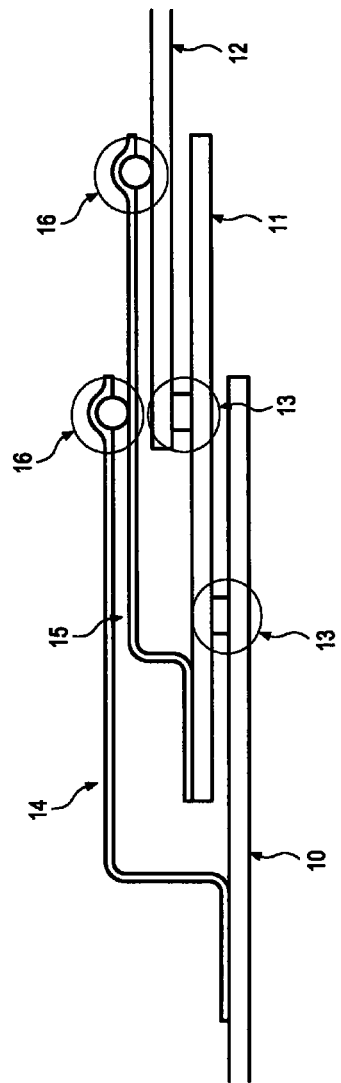
FIG. 3 shows a partial cross section view through the telescopic strut in a vertical plane containing the strut centreline, and showing the cross section above the centreline only.

The telescopic strut 7 will now be described in detail with reference to FIGS. 3 to 5. The telescopic strut 7 includes three coaxial hollow tubular members 10, 11, 12. The inner tubular member 10 is slidable with respect to the intermediate tubular member 11, which is in turn slidable with respect to the outer tubular member 12.

Between each adjacent pair of tubular members 10, 11, 12 there is provided a plurality of electrical connector assemblies 13 arranged circumferentially in a space between adjacent ones of the tubular members. One such electrical connector assembly 13 is shown in FIG. 3 between the inner tube 10 and the intermediate tube 11, and a further electrical connector assembly 13 is shown between the intermediate tube 11 and the outer tube 12. The electrical connector assemblies 13 transmit electrical power between the tubes 10, 11, 12. Covers 14, 15 are attached to the tubes 10, 11, 12 to provide environmental protection to the electrical components of the telescopic strut 7. The covers 14, 15 each have a sealing element 16 at one end to ensure good environmental protection capabilities over the full range of telescoping movement of the strut 7.

Figure 4:
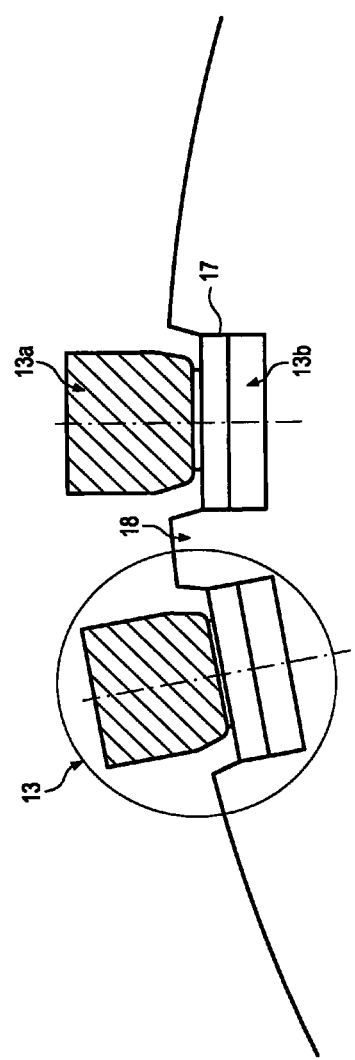
FIG. 4 shows a partial cross section view through the telescopic strut in a vertical plane perpendicular to the longitudinal axis of the strut, and showing two electrical connector assemblies.
Figure 5:
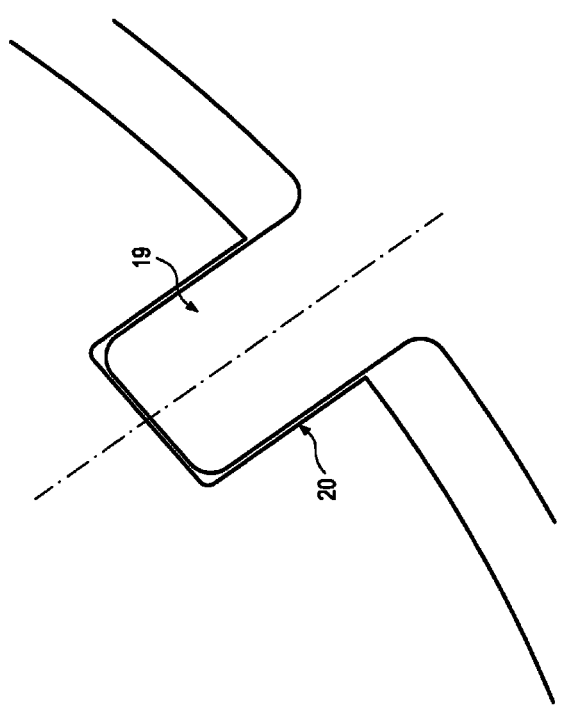
FIG. 5 shows a partial cross section view through the telescopic strut in a vertical plane perpendicular to the longitudinal axis of the strut, and showing a spigot cooperating with a respective recess of adjacent hollow members.

As best shown in FIG. 4, each electrical connector assembly 13 includes an electrically conductive pad 13a on one of the tubes which is in sliding contact with an electrically conductive strip 13b of an adjacent tube. The electrically conductive strips 13b are disposed in a groove 17 within which the respective electrically conductive pads 13a slide. At the side of each electrically conductive strip 13b is a dielectric barrier 18 to prevent arcing between neighbouring electrical connector assemblies 13. The electrically conductive strips 13b are provided on the outer surface of the inner and intermediate tubes 10, 11, and the electrically conductive pads 13a are provided on the inner surface of the intermediate and outer tubes 11, 12. The electrically conductive pads 13a on the inner surface of the intermediate tube 11 are electrically connected with respective electrically conductive strips 13b on the outer surface of the intermediate tube 11.

To transmit loads from one tube to another and to maintain alignment of the tubes, sliding spigots operate between the tubes 10, 11, 12. FIG. 5 shows one such spigot 19 projecting inwardly from an inner surface of one tube and which cooperates to slide within a recess 20 of an adjacent more inwardly disposed tube of the telescopic strut 7. A minimum of three spigots 19 are required between adjacent tubes. These are sized to ensure that, during normal use, loads applied to the strut 7 will not be able to jam or buckle the strut.

In the embodiment described above, around sixty to seventy electrical connector assemblies are provided between each adjacent pair of tubes and the largest (the outer tube) 12 is around 4-5 inches in diameter. However, it will be appreciated that a greater or fewer number of electrical connector assemblies 13 may be provided which may impact on the size of the telescopic strut 7. In the embodiment described above, the telescopic strut 7 has three tubes which enable the strut to approximately double in length from approximately 300 mm to approximately 600 mm when fully extended. However, it will be appreciated that a greater or fewer number of tubes may be provided of longer or shorter length according to desired telescoping requirements. However, it will be appreciated that the greater the number of tubes, the greater the maximum diameter of the strut for any given strut length.

In the embodiment described above the sealing elements 16 are O-ring seals, but other sealing arrangements may be used such as blade seals, P-seals, or D-seals.

The tubes may be made of any suitable material but are preferably made of non-conductive thermoplastic as this provides an inexpensive lightweight solution. In some circumstances it may be desirable for the tubes to be made of conductive material such that the tubes form part of an electrical shield to protect against interference between electrical signals of adjacent electrical connector assemblies. The covers may be made of any suitable material according to the desired environmental protection they are intended to afford to the electrical components of the strut.

The electrically conductive strips are preferably copper strips but any other suitable conductive material may be used. The electrically conductive pads are preferably graphite pads but may also be made of any other suitable material. The pads could extend along the full length of travel of their respective tubes. However, for the purposes of weight-saving, the pads do not run the full operational length of each tube, whereas the electrically conductive strips do run the full operational length of each tube. The telescopic strut of the above described embodiment is rated up to around 600 Volts but the telescopic strut could be adapted for a higher or lower rating as appropriate. For higher ratings, a greater distance of dielectric material between adjacent electrical connector assemblies may be required to prevent arcing.

In the above described embodiment, the electrically conductive strips 13b are disposed longitudinally within their respective grooves. The telescopic strut is adapted to extend and retract with no relative rotation between the ends 8, 9 of the strut 7. However, it will be appreciated by those skilled in the art that, where desired, relative rotation between the ends of the strut may be provided by disposing the spigots in respective helical recesses. In this case, the electrically conductive strips would also need to be disposed helically along the tubes.

To ensure positive electrical contact between the electrically conductive pad and the electrically conductive strip of each electrical connector assembly, the electrically conductive pad may be mounted upon a bias element, such as a leaf spring, disposed between the electrically conductive pad and the hollow member to which it is mounted.

Although the embodiment of the invention described above describes the telescopic strut as applied to aircraft leading edge structures, the telescopic strut has broader application. The electrical power transmitting telescopic strut may alternatively be physically and electrically connected across the main strut of an aircraft landing gear, for supplying electrical power from the aircraft to, for example, an electrical wheel braking assembly.

Although the invention has been described above with reference to one or more preferred embodiments, it will be appreciated that various changes or modifications may be made without departing from the scope of the invention as defined in the appended claims.

The invention claimed is:

1. A telescopic strut comprising a plurality of hollow members arranged to slide one within another between a retracted and an extended position, wherein adjacent hollow members are arranged to be electrically connected by one or more electrical connector assemblies as the hollow members move between the retracted and extended positions, wherein each electrical connector assembly includes an electrically conductive pad on one of the hollow members and an electrically conductive strip on the other of the hollow members, said conductive pad in sliding contact with said conductive strip.

2. A telescopic strut according to claim 1, wherein each electrically conductive strip is set in a groove.

3. A telescopic strut according to claim 2, wherein each electrically conductive pad is arranged to run within the groove of its respective electrically conductive strip.

4. A telescopic strut according to claim 1, wherein a plurality of electrical connector assemblies are arranged between adjacent hollow members.

5. A telescopic strut according to claim 4, wherein adjacent electrically conductive strips are separated by dielectric material.

6. A telescopic strut according to claim 4, wherein adjacent electrically conductive strips are electrically shielded.

7. A telescopic strut according to claim 1, wherein the or each electrically conductive pad is biased against its respective electrically conductive strip.

8. A telescopic strut according to claim 1, wherein alignment of adjacent hollow members is maintained by one or more spigots on one of the hollow members which cooperate with a respective recess on the other of the hollow members.

9. A telescopic strut according to claim 1, further comprising one or more covers for sealing ends of the hollow members.

10. A telescopic strut according to claim 9, wherein one end of each cover is attached to an outer surface of one of the hollow members, and the other end of each cover has a sealing element for sealing the cover against either another cover or another one of the hollow members.

11. A telescopic strut according to claim 1, further comprising an electrical connection terminal at one or both ends of the strut.

12. An aircraft comprising a fixed aerofoil structure and a control surface moveable between a refracted and an extended position with respect to the fixed aerofoil structure, and a telescopic strut physically and electrically connected between the fixed aerofoil structure and the control surface and which telescopes with the movement of the control surface, wherein the telescopic strut includes at least two tubular members, at least one electrical connector assembly, said assembly having an electrically conductive pad mounted on one of said tubular members in sliding contact with a corresponding electrically conductive strip mounted on an adjacent tubular member for maintaining the electrical connection between said at least two tubular members during telescoping of the strut.

13. An aircraft according to claim 12, wherein the telescopic strut comprises a plurality of hollow members arranged to slide one within another between a retracted and an extended position, wherein adjacent hollow members are arranged to be electrically connected by one or more electrical connector assemblies as the hollow members move between the retracted and extended positions, wherein each electrical connector assembly includes an electrically conductive pad on one of the hollow members which is in sliding contact with an electrically conductive strip on the other of the hollow members.

14. An aircraft according to claim 12, further comprising an actuator connected between the fixed aerofoil structure and the control surface for moving the control surface between the retracted and extended positions.

15. An aircraft according to claim 12, wherein telescoping of the strut is driven passively by movement of the control surface between the retracted and extended positions.

* * * * *